US009064207B2

(12) United States Patent
Yamada

(10) Patent No.: US 9,064,207 B2
(45) Date of Patent: Jun. 23, 2015

(54) PRINTING APPARATUS AND PRINTING SYSTEM CONTROLLING CONNECTION BETWEEN A PRINTING APPARATUS AND AN EXTERNAL APPARATUS

(71) Applicant: BROTHER KOGYO KABUSHIKI KAISHA, Nagoya-shi, Aichi-ken (JP)

(72) Inventor: Akihiro Yamada, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/737,615

(22) Filed: Jan. 9, 2013

(65) Prior Publication Data
US 2013/0176595 A1 Jul. 11, 2013

(30) Foreign Application Priority Data

Jan. 10, 2012 (JP) ................................. 2012-001976

(51) Int. Cl.
G06K 15/00 (2006.01)
G06F 3/12 (2006.01)

(52) U.S. Cl.
CPC .......... *G06K 15/4045* (2013.01); *G06F 3/1222* (2013.01); *G06F 3/1236* (2013.01); *G06F 3/1238* (2013.01); *G06F 3/1274* (2013.01); *G06F 3/1288* (2013.01)

(58) Field of Classification Search
USPC ................................. 358/1.16, 1.1
See application file for complete search history.

(56) References Cited

U.S. PATENT DOCUMENTS

| 8,228,537 | B2 | 7/2012 | Uehara | |
|---|---|---|---|---|
| 2007/0083752 | A1* | 4/2007 | Kanou et al. | 713/156 |
| 2009/0080022 | A1 | 3/2009 | Tsutsumi | |
| 2011/0090533 | A1 | 4/2011 | Shimizu | |
| 2011/0134465 | A1* | 6/2011 | Gha | 358/1.15 |

FOREIGN PATENT DOCUMENTS

| EP | 1 310 863 A2 | 5/2003 |
|---|---|---|
| JP | 2003-108333 A | 4/2003 |

(Continued)

OTHER PUBLICATIONS

Ikegami, Network Printing System, Its Program and Recording Medium, Nov. 21, 2003, JP 2003330686 A.*

(Continued)

*Primary Examiner* — Martin Mushambo
(74) *Attorney, Agent, or Firm* — Merchant & Gould PC

(57) ABSTRACT

A printing apparatus includes: a job storage unit configured to store a print job; a printing unit configured to perform a printing operation based on the stored print job; a receiving unit configured to receive an instruction to disconnect connection with an external apparatus; and a control device configured to perform: an establishment process of establishing connection with the external apparatus; a storage process of storing a print job received from the external apparatus in the job storage unit; a first deletion process of deleting the print job, for which a printing-related operation has been completed, from the job storage unit; a disconnection process of disconnecting the connection in response to a disconnection instruction received by the receiving unit; and a prohibition process of prohibiting performing the disconnection process after the printing-related operation starts until all the print jobs are deleted from the job storage unit.

19 Claims, 12 Drawing Sheets

(56) References Cited

FOREIGN PATENT DOCUMENTS

| JP | 2003-330686 A | 11/2003 |
|---|---|---|
| JP | 2004-345358 A | 12/2004 |
| JP | 2007-098922 A | 4/2007 |
| JP | 2009-080666 A | 4/2009 |
| JP | 2009272810 A | 11/2009 |
| JP | 2010-036522 A | 2/2010 |

OTHER PUBLICATIONS

European Search Report issued in EP 12196625.3, Mar. 11, 2014.
U.S. Appl. No. 13/487,913, filed Jun. 4, 2012 entitled "Image Forming System and Image Forming Device," 130 Pages.
Office Action for Japanese Patent Application No. 2012-001976 issued Mar. 10, 2015, 10 pages.

* cited by examiner

| USER ID | PASSWORD | NOTIFICATION FLAG | SIGN-OUT REQUEST FLAG |
|---|---|---|---|
| ACCOUNT 1 | ***** | ON | ON |

| USER ID | PASSWORD | PRINTER INFORMATION | PC CONNECTION FLAG | JOB ACQUISITION NOTIFICATION FLAG | JOB TRANSMISSION FLAG |
|---|---|---|---|---|---|
| ACCOUNT 1 | ***** | 192.168.0.1 | ON | ON | ON |
| ACCOUNT 2 | ***** | 192.168.0.10 | OFF | OFF | OFF |

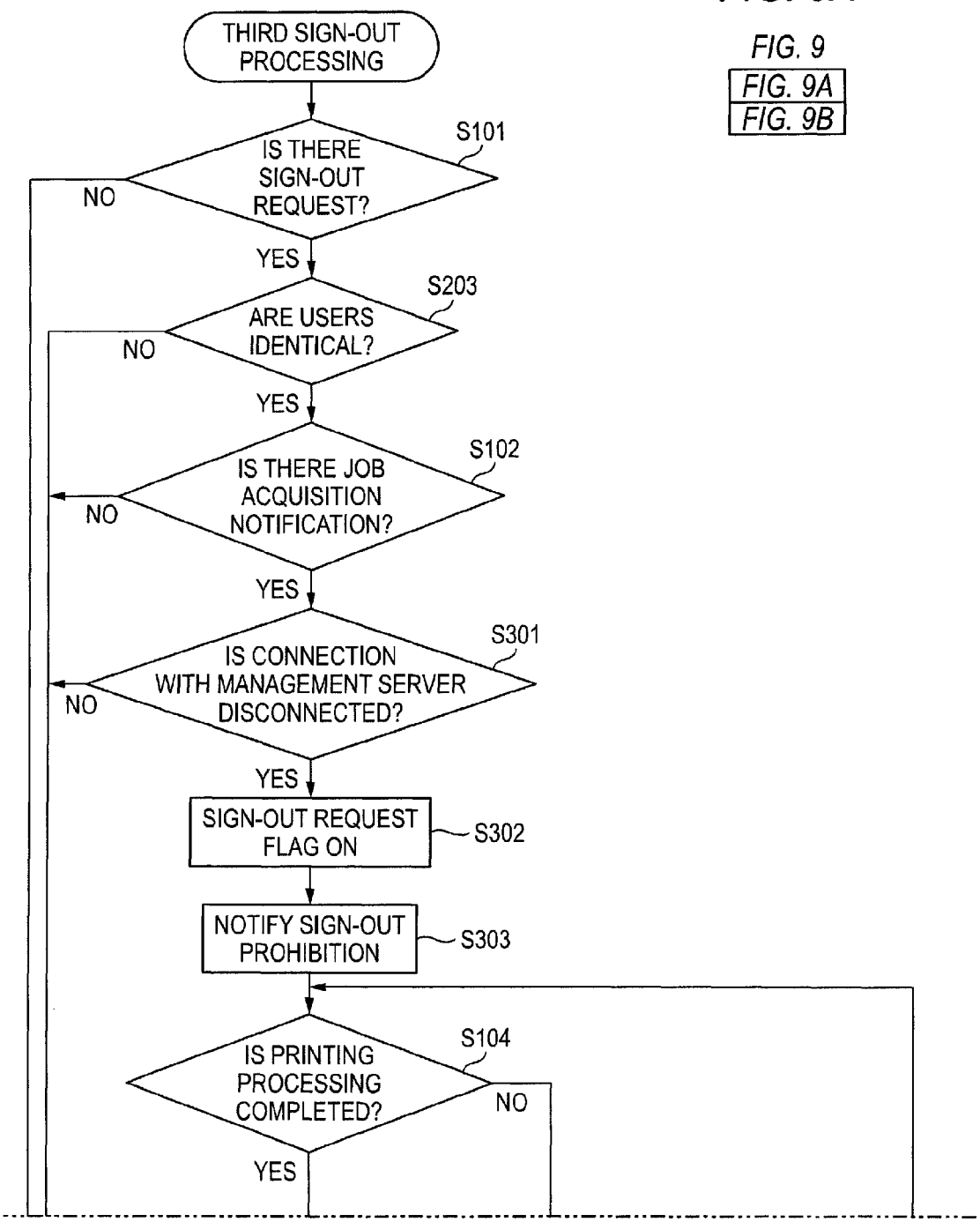

PRINTING APPARATUS AND PRINTING SYSTEM CONTROLLING CONNECTION BETWEEN A PRINTING APPARATUS AND AN EXTERNAL APPARATUS

CROSS-REFERENCE TO RELATED APPLICATIONS

This application claims priority from Japanese Patent Application No. 2012-001976 filed on Jan. 10, 2012, the entire subject matter of which is incorporated herein by reference.

BACKGROUND

There have been proposed a configuration where a server and a printing apparatus are connected with a network. According to a related-art printing apparatus, when a user ID and a password are input from an operation unit, the input user ID and password are transmitted to a server, and the server performs user authentication. When the authentication is successful, an authenticated state is made. Further, when the user presses a logout key, the authenticated state is released.

SUMMARY

In the above-described related-art printing apparatus, even when the user presses the logout key during the printing, the authenticated state may be released. When the authenticated state is released, the server and the printing apparatus are unable to perform communication.

Therefore, illustrative aspects of the invention provide a printing apparatus capable of avoiding a situation where an external apparatus and the printing apparatus are unable to perform communication during a printing-related operation.

According to a first illustrative aspect of the invention, there is provided A printing apparatus comprising: a job storage unit configured to store a print job; a printing unit configured to perform a printing operation based on the print job stored in the job storage unit; a receiving unit configured to receive an instruction to disconnect connection with an external apparatus; and a control device. The control device is configured to perform: an establishment process of establishing connection with the external apparatus; a storage process of storing a print job received from the external apparatus in the job storage unit; a first deletion process of deleting the print job, for which a printing-related operation has been completed, from the job storage unit; a disconnection process of disconnecting the connection in response to the disconnection instruction received by the receiving unit; and a prohibition process of prohibiting performing the disconnection process after the printing-related operation starts until all the print jobs are deleted from the job storage unit.

According to this printing apparatus, when the print job is received, the print job is stored in the job storage unit and the printing is performed based on the print job. When the printing-related operation is completed, the print job is deleted from the job storage unit. Further, the disconnection of the connection with the external apparatus is prohibited and the connection with the external apparatus is maintained after the printing-related operation starts until all print jobs are deleted from the job storage unit. According to this configuration, it is possible to avoid a situation where the external apparatus and the printing apparatus are unable to perform communication during the printing-related operation.

According to a second illustrative aspect of the invention, the printing apparatus according to the first illustrative aspect further comprises: a connection user storage unit configured to store user information indicating a user who establishes the connection, wherein the control device is further configured to perform: a disconnection user acquisition process of acquiring user information indicating a user who inputs the disconnection instruction, when receiving the disconnection instruction; and a first determination process of determining whether the user information stored in the connection user storage unit is identical to the user information acquired by the disconnection user acquisition process, and wherein the control device is configured to perform the disconnection process in response to the received disconnection instruction when the first determination process determines that the user information is identical.

It may be considered that there is a high possibility that a user who disconnects the connection will be aware that disconnection of the connection causes the external apparatus and the printing apparatus to be unable to perform communication. Therefore, according to this configuration, when the user having established the connection is identical to the user who disconnects the connection, the connection is disconnected. Thereby, a possibility that the control will be made in correspondence to the user's intention is increased, which contributes to the convenience of the user.

According to a third illustrative aspect of the invention, the printing apparatus according to the first or second illustrative aspect further comprises: an instruction storage unit configured to store that the receiving unit receives the disconnection instruction, wherein when the instruction storage unit stores that the disconnection instruction is received, the control device is configured to perform the disconnection process after all the print jobs are deleted from the job storage unit.

According to this configuration, it is not necessary for the user to instruct the disconnection of the connection several times, which contributes to the convenience of the user.

According to a fourth illustrative aspect of the invention, the printing apparatus according to any one of the first to third illustrative aspect further comprises: an abort receiving unit configured to receive an instruction to abort the print job, wherein the control device is further configured to perform: an abort user acquisition process of, when the abort instruction is received, acquiring user information indicating a user who inputs the abort instruction; a second determination process of determining whether the user information, which indicates that a user who inputs an instruction to execute a print job that is a target of the abort, is identical to the user information acquired by the abort user acquisition process; and a second deletion process of deleting the print job, which is a target of the abort, from the job storage unit when the second determination process determines that the user information is identical.

According to this configuration, when the abort of the printing is received and the user who instructs the execution of the print job is identical to the user who instructs the abort of the printing, the print job that is a target of the abort is deleted from the storage unit, so that the disconnection of the connection can be instructed. Therefore, when the abort instruction is issued, it is possible to avoid a situation where the connection with the external apparatus is unable to be disconnected.

According to a fifth illustrative aspect of the invention, the printing apparatus according to the first to fourth illustrative aspect further comprises a first notification unit configured to notify that the disconnection instruction is not received, wherein the control device is further configured to perform: a first notification process of controlling the first notification unit to notify that the disconnection instruction is not received when the prohibition process prohibits performing the disconnection process.

According to this configuration, the user can know that the disconnection of the connection with the external apparatus is prohibited, which contributes the convenience of the user.

According to a sixth illustrative aspect of the invention, the printing apparatus according to the third illustrative aspect further comprises a second notification unit which, when the instruction storage unit stores that the disconnection instruction is received, is configured to notify that the disconnection process will be performed after all the print jobs are deleted from the job storage unit, wherein the control device is configured to perform: a second notification process of, when the instruction storage unit stores that the disconnection instruction is received, notifying that the disconnection process will be performed after all the print jobs are deleted from the job storage unit.

According to this configuration, the user can know that it is not necessary to again issue the disconnection instruction, which contributes the convenience of the user.

According to a seventh illustrative aspect of the invention, there is provided a printing system comprising an external apparatus and a printing apparatus that is configured to communicate with the external apparatus, wherein the external apparatus comprises a transmission unit configured to transmit a print job, wherein the printing apparatus comprises: a job storage unit configured to receive and store the print job; a printing unit configured to perform a printing operation based on the print job stored in the job storage unit; a receiving unit configured to receive an instruction to disconnect connection with the external apparatus; and a first control device. The first control device is configured to perform: a first connection establishment process of establishing a first connection with the external apparatus; a deletion process of deleting the print job from the job storage unit when a printing-related operation based on the print job stored in the job storage unit has been completed; a first disconnection process of disconnecting the first connection in response to the received disconnection instruction; and a prohibition process of prohibiting receiving the disconnection instruction after the printing-related operation starts until all the print jobs are deleted from the job storage unit.

According to an eighth illustrative aspect of the invention, in the printing system according to the seventh illustrative aspect, wherein the external apparatus is configured to communicate with an information processing apparatus having a display unit, wherein the external apparatus comprises a second control device configured to perform: a second connection establishment process of establishing a second connection with the information processing apparatus; and a second disconnection process of disconnecting the second connection established by the second connection establishment process, and wherein the first control device is configured to perform the first disconnection process when the second control device performs the second disconnection process.

According to the printing system, a status of the printing apparatus is displayed on the display unit of the information processing apparatus. When the connection between the printing apparatus and the server is disconnected, the user is unable to check a status of the printing apparatus. However, when the connection between the information processing apparatus and the server is disconnected, it may be considered that the user has no intention to check a status of the printing apparatus. Therefore, according to this configuration, there is no problem for the user having established the connection between the printing apparatus and the server even though the connection between the printing apparatus and the server is disconnected. Further, another user who desires to establish the connection between the printing apparatus and the server can establish that connection, so that this configuration contributes to the convenience of another user.

BRIEF DESCRIPTION OF THE DRAWINGS

FIG. 3 shows an example of a user information table that is common to the first to fifth exemplary embodiments of the invention;

FIG. 4 shows an example of a management table that is common to the first to fifth exemplary embodiments of the invention;

FIGS. 9A and 9B are flow charts showing a sequence of third sign-out processing of the invention;

DETAILED DESCRIPTION

First Exemplary Embodiment

Hereinafter, a first exemplary embodiment of the printing apparatus of the invention will be specifically described with reference to the accompanying drawings. In this exemplary embodiment, the invention is applied to a printer having a function of acquiring and printing a print job from a server.

(Configuration of Printer)

Figure 1:
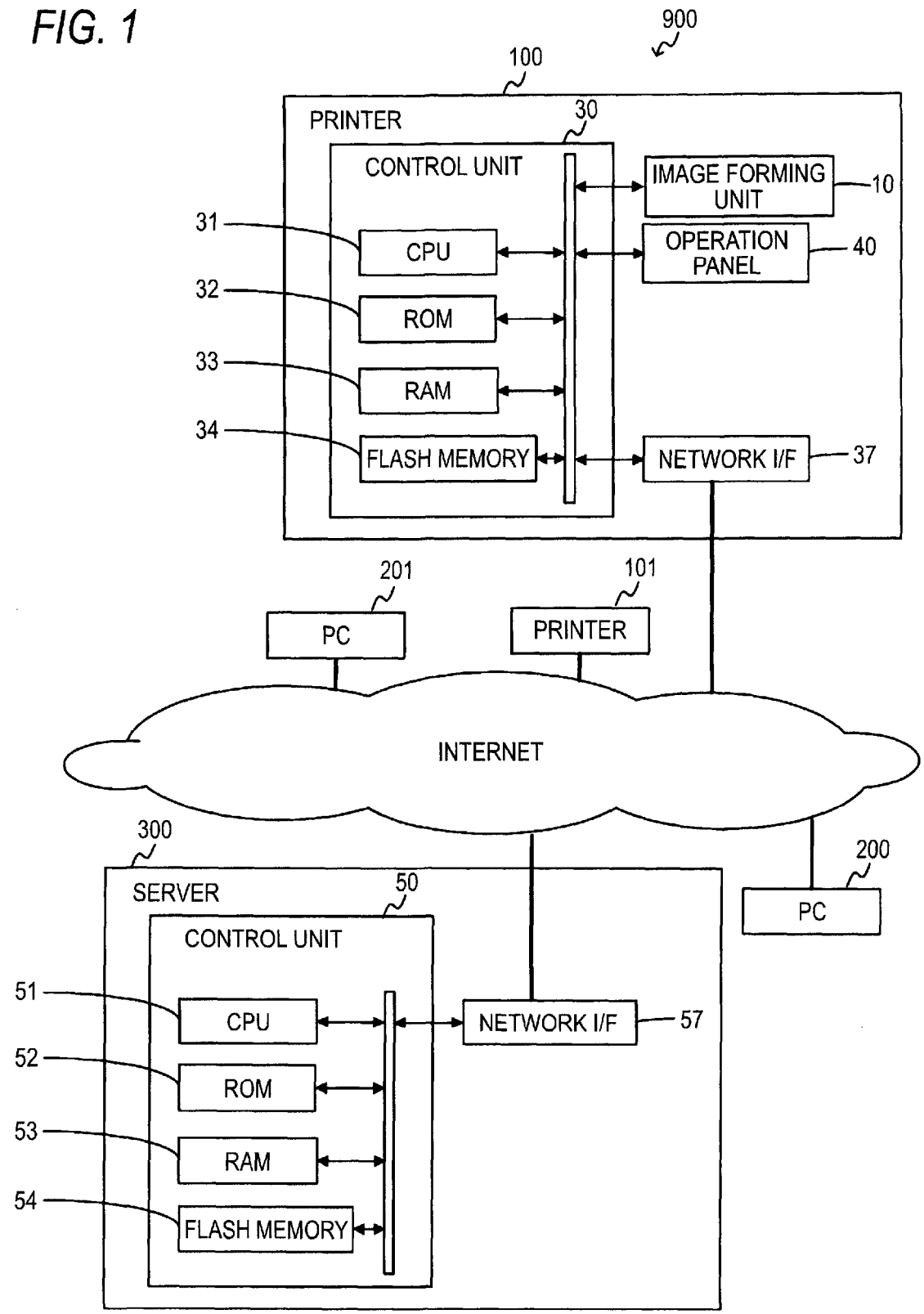
FIG. 1 is a block diagram showing an electrical configuration of a printer that is common to first to fifth exemplary embodiments of the invention.

As shown in FIG. 1, a printer 100 (one example of a 'printing apparatus') of this exemplary embodiment includes a control unit 30 having a CPU 31, a ROM 32, a RAM 33 and a flash memory 34. The control unit 30 is electrically connected to an image forming unit 10 configured to print an image on a sheet, an operation panel 40 (one example of an 'operation unit') configured to display an operating status and receive an input operation of a user and a network interface 37.

The ROM 32 stores therein firmware that is a control program for controlling the printer 100, various settings, initial values and the like. The RAM 33 and the flash memory 34 (which are examples of a 'storage unit', 'connection user storage unit', 'instruction storage unit' and 'job storage unit') are used as work areas from which the various control programs are read out or as storage areas that temporarily store a print job. The CPU 31 and the RAM 33 or the CPU 31 and the flash memory 34 cooperate with each other and function as one example of a 'first deletion unit', 'second deletion unit' and 'deletion unit.'

Figure 2:
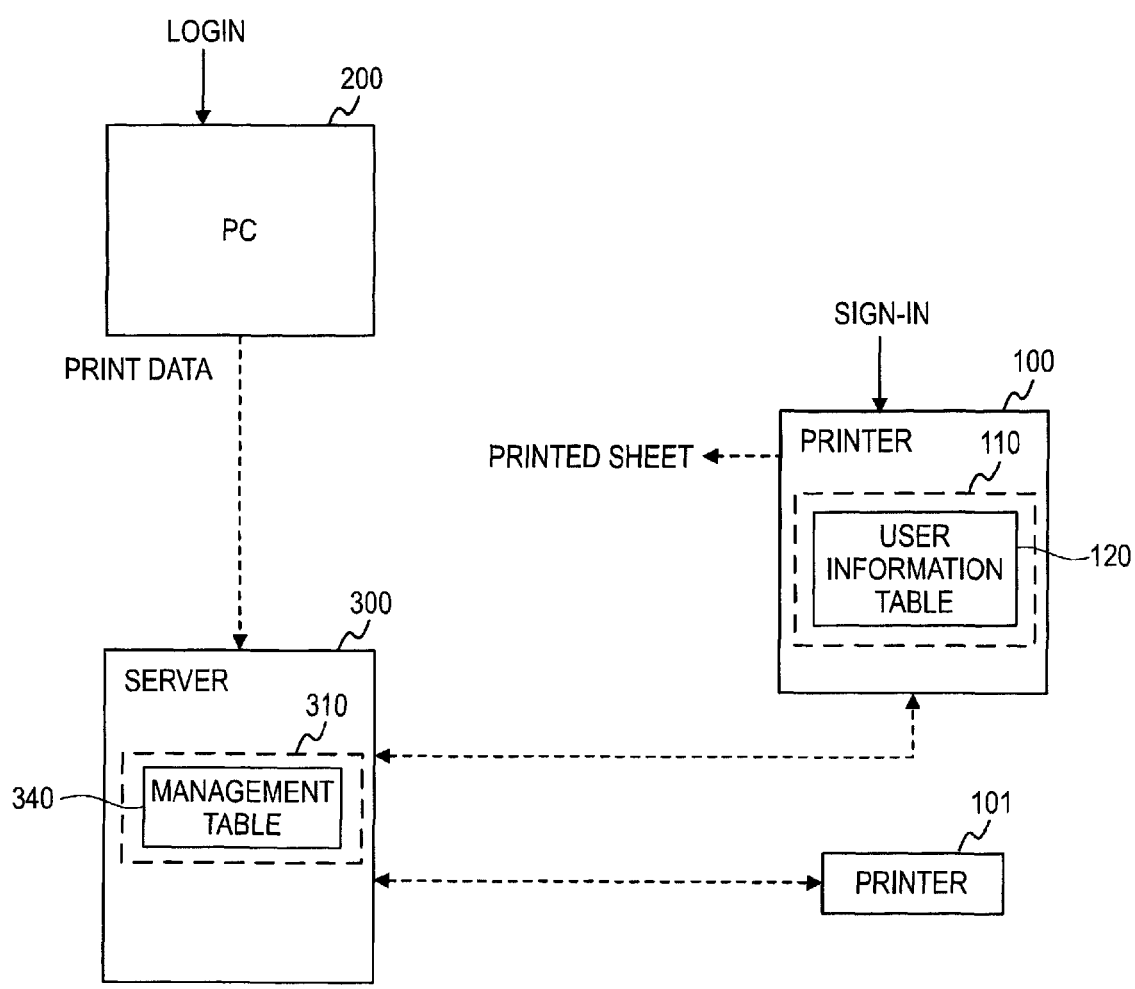
FIG. 2 is a block diagram showing a schematic operation of a printing system that is common to the first to fifth exemplary embodiments of the invention.

The flash memory 34 is a non-volatile memory in which data is not deleted even when power is off. The flash memory 34 is used as a storage area storing a variety of settings that are set by a user after shipment. For example, as shown in FIG. 2, a user information table 120 is stored in a memory area 110 (which is configured by the RAM 33 and the flash memory 34). The user information table 120 stores account information such as user ID and password and a variety of flags, as one record, as shown in FIG. 3. The various flags will be described later.

The CPU 31 (which is one example of an 'establishment unit', 'prohibition unit', 'disconnection user acquisition unit', 'first determination unit', 'first release unit', 'abort user acquisition unit', 'second determination unit', 'first connection establishment unit', 'disconnection unit', 'first disconnection unit', 'first deletion unit', 'second deletion unit' and 'deletion unit') is configured to control respective elements of the printer 100 while storing a processing result in the RAM 33 or flash memory 34 in response to signals transmitted from the control program read out from the ROM 32 or a variety of sensors.

The network interface 37 (which is one example of an 'establishment unit', 'disconnection unit', 'first disconnection unit' and 'first connection establishment unit') is an interface enabling communication with other apparatus. The printer 100 receives data transmitted from the other apparatus through the network interface 37.

In this exemplary embodiment, the printer 100 is enabled to perform communication with a personal computer (PC) 200 (which is one example of an 'information processing apparatus') and a management server 300 (which is one example of a 'server') via the network interface 37. The printer 100 configures a printing system 900 together with the communication apparatuses such as the PC 200 and the management server 300.

The image forming unit 10 (which is one example of a 'printing unit') may be arbitrary insomuch as it can print an image on a sheet. As an image forming method, an electrophotographic method or inkjet method may be used. The image forming unit may print a color image or a monochrome image only.

The operation panel 40 (which is one example of a 'receiving unit', 'abort receiving unit', 'first notification unit' and 'second notification unit') has a variety of buttons for receiving a user input and a touch panel screen for displaying character information, a button and the like. The various buttons include an OK button for instructing a start of a printing operation, an abort button for instructing an abort of a printing operation, a sign-in button for establishing connection with the management server 300 and a sign-out button for disconnecting the connection with the management server 300.

(Configuration of Management Server)

In this exemplary embodiment, as shown in FIG. 1, the management server 300 includes a control unit 50 having a CPU 51, a ROM 52, a RAM 53 and a flash memory 54. The control unit 50 is electrically connected to a network interface 57.

The ROM 52 stores therein a variety of control programs, various settings, initial values and the like. The RAM 53 and the flash memory 54 (which are one example of a 'job storage unit') are used as work areas from which the various control programs are read out or as a memory area 310 that temporarily stores a print job.

The CPU 51 (which is one example of a 'second connection establishment unit', 'determination unit', 'second determination unit' and 'second release unit') stores a processing result in the RAM 53 or flash memory 54 (which is one example of a 'storage unit'), in response to the control program read out from the ROM 52. For example, the flash memory 54 stores therein a management table 340 shown in FIG. 4. The CPU 51 and the RAM 53 or the CPU 51 and the flash memory 54 cooperate with each other and function as one example of a 'deletion unit.'

As shown in FIG. 2, the management server 300 has a database of user information and the like (hereinafter, referred to as 'management table 340'). The management table 340 is provided in the memory area 310 (RAM 53 or flash memory 54) of the management server 300.

As shown in FIG. 4, the management table 340 stores a user ID, a password, printer information and a variety of flags, as one record. For example, the printer information is destination information of the printer 100, for example, an IP address and the like.

The network interface 57 (which is one example of a 'second connection establishment unit' and 'second disconnection unit') is an interface enabling communication with other apparatus. The management server 300 receives a variety of requests that are transmitted from the printer 100 and a print job that is transmitted from the PC 200, via the network interface 57.

(Configuration of Printing System)

Subsequently, a configuration and an operation of the printing system 900 including the printer 100 will be described with reference to FIG. 2.

In the printing system 900, when the PC 200 receives the account information of a user ID and a password input by a user operation, the PC 200 logs in the management server 300, so that a connection between the PC 200 and the management server 300 is established. When the printer 100 receives the account information input by a user operation, like the PC 200, the printer 100 signs in the management server 300 (which is one example of a 'connection'), so that a connection between the printer 100 and the management server 300 is established.

That is, in the printing system 900, when the PC 200 logs in the management server 300 and the printer 100 signs in the management server 300 by using the same account information, the printer 100 is designated from the PC 200 and is enabled to perform a printing operation.

Incidentally, in the specification, for convenience, a user operation of inputting the account information into the management server 300 from the PC 200 so as to establish the connection between the PC 200 and the management server 300 is referred to as 'login.' Further, a user operation of inputting the account information into the management server 300 from the printer 100 so as to establish the connection between the printer 100 and the management server 300 is referred to as 'sign-in.'

Further, in the specification, the connection and disconnection between the management server 300 and the printer 100 are not limited to physical connection and disconnection. The connection includes a state where data can be transmitted and received, and the disconnection includes a state where data are unable to be transmitted and received.

In the printing system 200 shown in FIG. 2, a printer 101 signs in the management server 300 by using the same account information, like the printer 100. For example, when the PC 200 receives a printing instruction for the printer 100 from the user, the PC transmits a print job including data of PDF and JPEG formats and the like to the management server 300. Then, the management server 300 inputs the print job to the printer 100. Incidentally, in the printing system 900, the management server 900 functions as a printer driver.

After receiving the print job, the printer 100 starts a printing operation based on the print job. After issuing the printing instruction to the printer 100, the user moves to a place where the printer 100 is provided and obtains the printed sheet.

(Control of Printer)

Subsequently, the control of the printer 100 implementing the operation of the printing system 900 will be described.

(Outline of Printing Operation)

Figure 5:
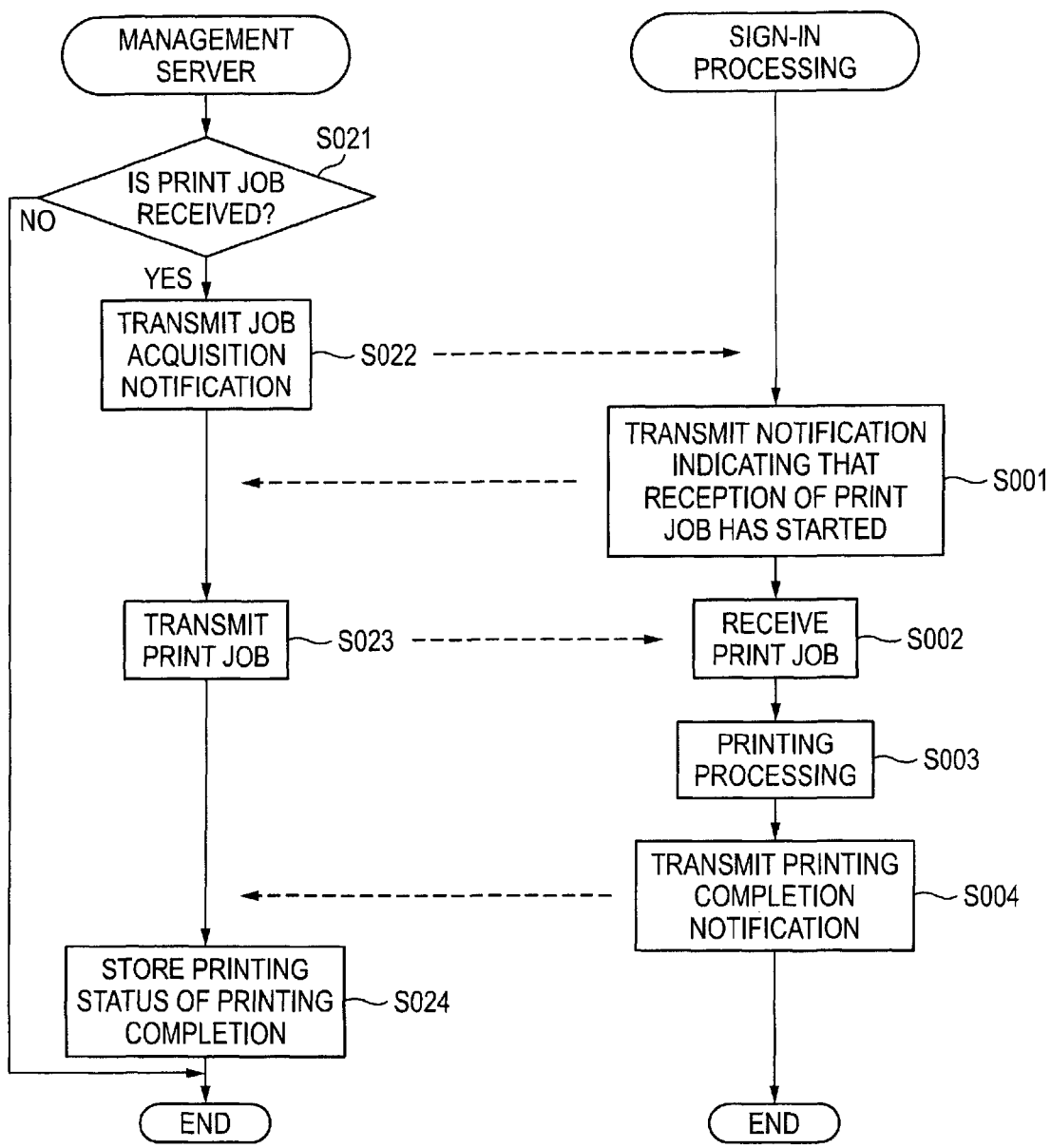
FIG. 5 is a flow chart showing an outline of a printing operation that is common to the first to fifth exemplary embodiments of the invention.

An operating sequence of each device implementing a printing operation of the printing system 900 will be described with reference to a flow chart of FIG. 5. Incidentally, it is assumed that the printer 100 is connected to the internet and is signed in the management server 300.

First, the CPU 51 determines whether a print job is received from the PC 200 (S021). When it is determined that a print job is not received (S021: NO), the CPU 51 ends the processing. That is, the printing is not performed.

On the other hand, when it is determined that a print job is received (S021: YES), the CPU 51 transmits a notification (hereinafter, referred to as 'job acquisition notification') to a printer that is designated at the time that the print job is received (e.g., the printer 100) to acquire the print job (S022).

When the printer 100 receives the job acquisition notification from the management server 300, the CPU 31 transmits information, which indicates that the reception of the print job has started (S001), to the management server 300. At this time, when the job acquisition notification is received from the management server 300, a notification flag shown in FIG. 3 is changed from OFF to ON.

When the management server 300 receives the information indicating that the reception of the print job has started from the printer 100, the CPU 51 transmits the print job to the printer 100 (S023). At this time, the CPU 51 transmits not only the print job but also the IP address and the like of the PC 200, which indicates a transmission source of the print job, to the printer 100.

Subsequently, when the printer 100 receives the print job and the IP address and the like of the PC 200 from the management server 300 (S002), the CPU 31 develops the print job and enables the image forming unit 10 to execute printing processing (S003). When the printer 100 receives the print job from the management server 300 while having received the job acquisition notification from the management server 300, as described above, the printer repeats the same operations and stores the print job in the memory area 110. Then, when the printing processing is completed, the printer issues a printing completion notification every print job (S004) and ends the processing.

When the management server 300 receives the printing completion notification, the CPU 51 stores a printing status of the printing completion in the flash memory 54 (S024) and ends the processing.

The printing is performed as described above. However, when the sign-out button of the operation panel 40 is pressed during the printing processing of the printer 100, for example, the connection between the management server 300 and the printer 100 is disconnected, so that the communication between the management server 300 and the printer 100 is unable to be performed. Therefore, the management server 300 is unable to acquire the printing status about the printer 100, such as during the printing processing or the printing completion.

In this case, since the management server 300 is unable to acquire the printing status, the management server 300 is unable to provide the printing status for the PC 200. That is, the user is unable to know the printing status of the printer 100.

Therefore, in the invention, while the printer 100 performs the printing, the disconnection between the management server 300 and the printer 100 is prohibited to avoid the situation where the user is unable to acquire the printing status of the printer 100 through the management server 300.

(First Sign-Out Processing)

Figure 6:
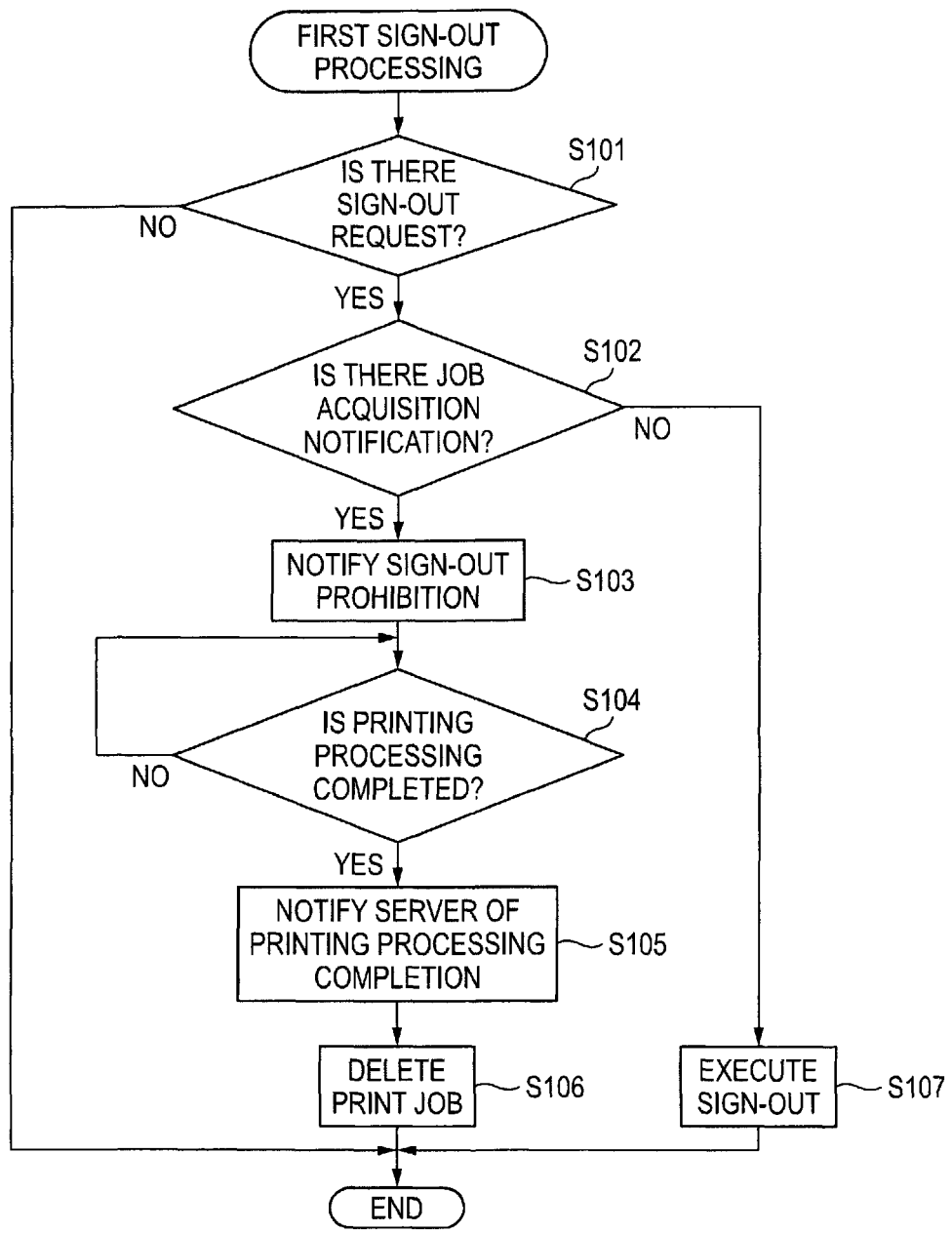
FIG. 6 is a flow chart showing a sequence of first sign-out processing of the invention.

First sign-out processing will be described with reference to FIG. 6. The first sign-out processing is executed every predetermined time, for example 1 millisecond after the above described sign-in is executed.

First, the CPU 31 determines whether the user presses the sign-out button of the operation panel 40 to thus request the sign-out (S101). When it is determined that the sign-out request is not made (S101: NO), the CPU 31 ends the first sign-out processing.

On the other hand, when it is determined that the sign-out request is made (S101: YES), the CPU 31 determines whether the job acquisition notification is issued from the management server 300 (S102). Here, in the determination of S102, it is determined whether a notification flag is ON or OFF. When the notification flag is ON, the CPU 31 determines that the job acquisition notification is issued from the management server 300. When the notification flag is OFF, the CPU 31 determines that the job acquisition notification is not issued from the management server 300.

When it is determined that there is no job acquisition notification (S102: NO), the CPU 31 executes the sign-out (S107), disconnects the connection between the printer 100 and the management server 300 and ends the first sign-out processing.

On the other hand, when it is determined that there is a job acquisition notification (S102: YES), the CPU 31 prohibits the sign-out and displays a message shown in FIG. 7 on the operation panel 40 to thus notify the user that the sign-out is unable to be executed (S103, which is one example of a 'prohibition unit' and 'first notification unit').

Subsequently, the CPU 31 determines whether the printing processing is completed (S104). When the printing processing is not completed (S104: NO), the CPU 31 stands by until the printing processing is completed.

When the printing processing is completed (S104: YES), the CPU 31 transmits information, which indicates that the printing processing has been completed, to the management server 300 (S105), deletes the print job stored in the RAM 33 (S106, which is one example of a 'first deletion unit' and 'deletion unit') and ends the first sign-out processing.

Incidentally, in S106, when deleting the print job from the RAM 33, the CPU 31 changes the notification flag from ON to OFF (which is one example of a 'first release unit'). In other words, even after the CPU 31 prohibits the sign-out in S103, when the printing processing is completed (S104: YES), the CPU 31 performs processing of S105 and S106 so as to release the prohibition of the sign-out. According thereto, when the user requests a sign-out thereafter, it is determined in S102 that there is no job acquisition notification (S102: NO) unless a job acquisition notification is issued from the management server 300, and the CPU 31 executes the sign-out (S107).

(Advantages of First Exemplary Embodiment)

As specifically described above, according to the first exemplary embodiment, when it is determined that there is the job acquisition notification (S102: YES), the CPU 31 prohibits the sign-out, displays the message shown in FIG. 7 on the operation panel 40 and notifies the user that the sign-out is unable to be executed (S103). Further, when deleting the print job from the RAM 33, the CPU 31 changes the notification flag from ON to OFF. Therefore, the sign-out is prohibited after the job acquisition notification is received until the print job is deleted from the RAM 33. Hence, while the notification flag is ON, e.g., when the printing processing is executed, it is possible to avoid a situation where the management server 300 and the printer 100 are unable to perform communication each other.

Figure 7:
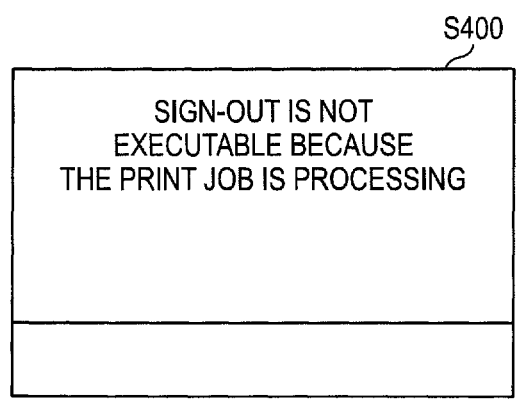
FIG. 7 shows an example of a message prohibiting sign-out in the first sign-out processing of the invention.

Further, the CPU 31 displays the message shown in FIG. 7 on the operation panel 40 and notifies the user that the sign-out is unable to be executed (S103). Therefore, the user can know that the sign-out is prohibited, which contributes to the convenience of the user.

Second Exemplary Embodiment

In a second exemplary embodiment, when a user who performs the sign-in and a user who desires to perform the sign-out are the same, the sign-out is performed. In this respect, the second exemplary embodiment is different from the first exemplary embodiment. The same processing as the first exemplary embodiment is indicated with the same reference numeral and the description thereof is appropriately omitted.

(Second Sign-out Processing)

Figure 8:
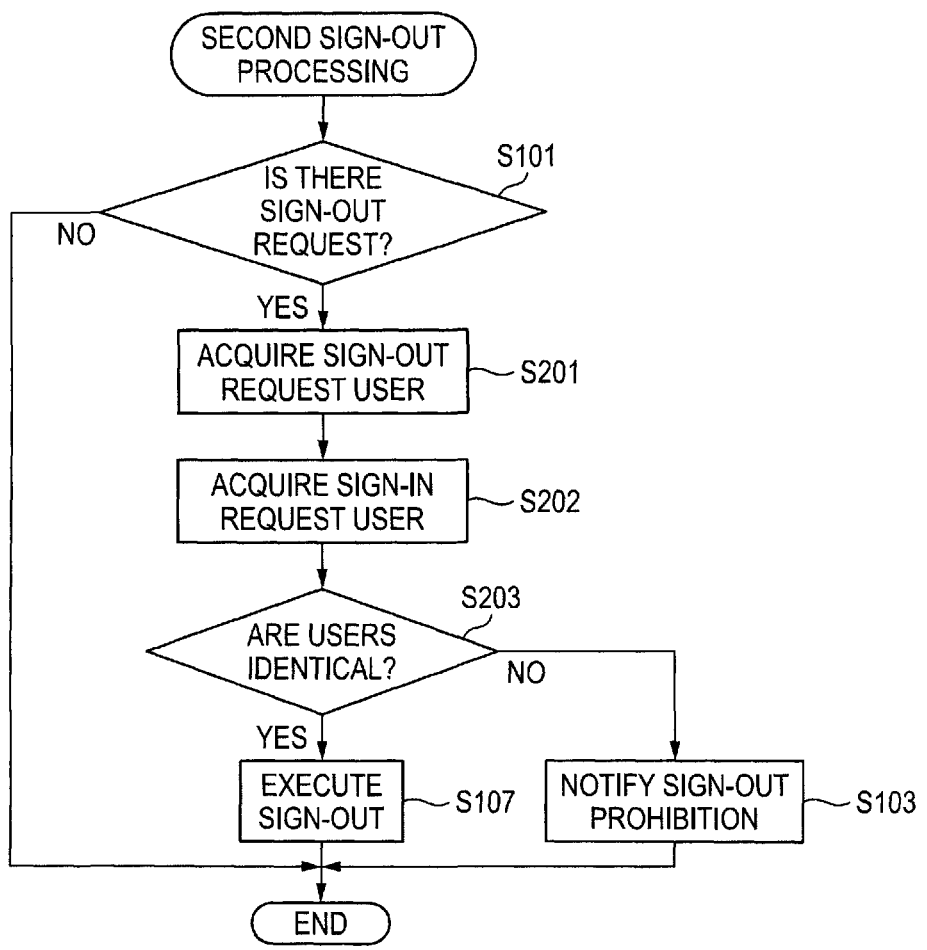
FIG. 8 is a flow chart showing a sequence of second sign-out processing of the invention.

Second sign-out processing will be described with reference to FIG. 8. The second sign-out processing is executed every predetermined time, for example 1 millisecond after the above described sign-in is executed. Incidentally, it is assumed that when the sign-in button of the operation panel 40 is pressed, the CPU 31 stores the user ID and password used for the sign-in in the user information table 120.

First, when it is determined that the sign-out request is made (S101: YES), the CPU 31 displays a message, which requests a user to input the user ID and password input for the sign-in, on the operation panel 40 in order to acquire the account information of the user having requested the sign-out through the operation panel 40 (S201, which is one example of a 'disconnection user acquisition unit'). Then, the CPU 31 stores the input user ID and password in the flash memory 34.

Then, the CPU 31 reads out the user ID and password of the user having performed the sign-in from the user information table 120 and acquires the account information of the user having performed the sign-in (S202).

Subsequently, the CPU 31 compares the respective account information acquired in S201 and S202 and determines whether the user having performed the sign-in is identical to the user having requested the sign-out (S203, which is one example of a 'first determination unit'). When it is determined that the user having performed the sign-in is identical to the user having requested the sign-out (S203: YES), the CPU 31 executes the sign-out (S107) and ends the second sign-out processing.

On the other hand, when it is determined that the user having performed the sign-in is not identical to the user having requested the sign-out (S203: NO), the CPU 31 prohibits the sign-out, displays a message, which indicates that the sign-out is unable to be executed, on the operation panel 40 and ends the second sign-out processing.

Incidentally, the above-described second exemplary embodiment may be combined with the first exemplary embodiment. For example, after performing S103 in the second sign-out processing, S104 to S107 in the first sign-out processing may be performed. Specifically, even after the CPU 31 determines that the user having performed the sign-in is not identical to the user having requested the sign-out (S203: NO) and prohibits the sign-out, when the printing processing is completed (S104: YES), the CPU 31 may perform processing of S105 and S106 so as to release the prohibition of the sign-out. When the user requests a sign-out thereafter, unless a job acquisition notification is issued from the management server 300, the CPU 31 executes the sign-out (S107).

(Advantages of Second Exemplary Embodiment)

As specifically described above, according to the second exemplary embodiment, the CPU 31 determines whether the user having performed the sign-in is identical to the user having requested the sign-out (S203). When it is determined that the user having performed the sign-in is identical to the user having requested the sign-out (S203: YES), the CPU 31 executes the sign-out (S107). It is considered that the user requesting the sign-out is aware that an execution of the sign-out makes the connection between the management server 300 and the printer 100 disconnected so that the communication is unable to be performed. Therefore, when it is determined that the user having performed the sign-in is identical to the user having requested the sign-out, the sign-out is executed. Thereby, a possibility that the control will be made in correspondence to the user's intention is increased, which contributes to the convenience of the user.

Third Exemplary Embodiment

In a third exemplary embodiment, when the connection between the PC 200 and the management server 300 is disconnected, the sign-out is executed. Further, when the sign-out button is pressed during the printing, though the sign-out is prohibited, the information indicating that the sign-out button is pressed is stored. Hence, the sign-out is automatically executed after the printing is completed, even though the sign-out button is not pressed again. In these respects, the third exemplary embodiment is different from the first and second exemplary embodiments. The same processing as the first and second exemplary embodiments is indicated with the same reference numeral and the description thereof is appropriately omitted.

(Third Sign-out Processing)

Figure 9B:
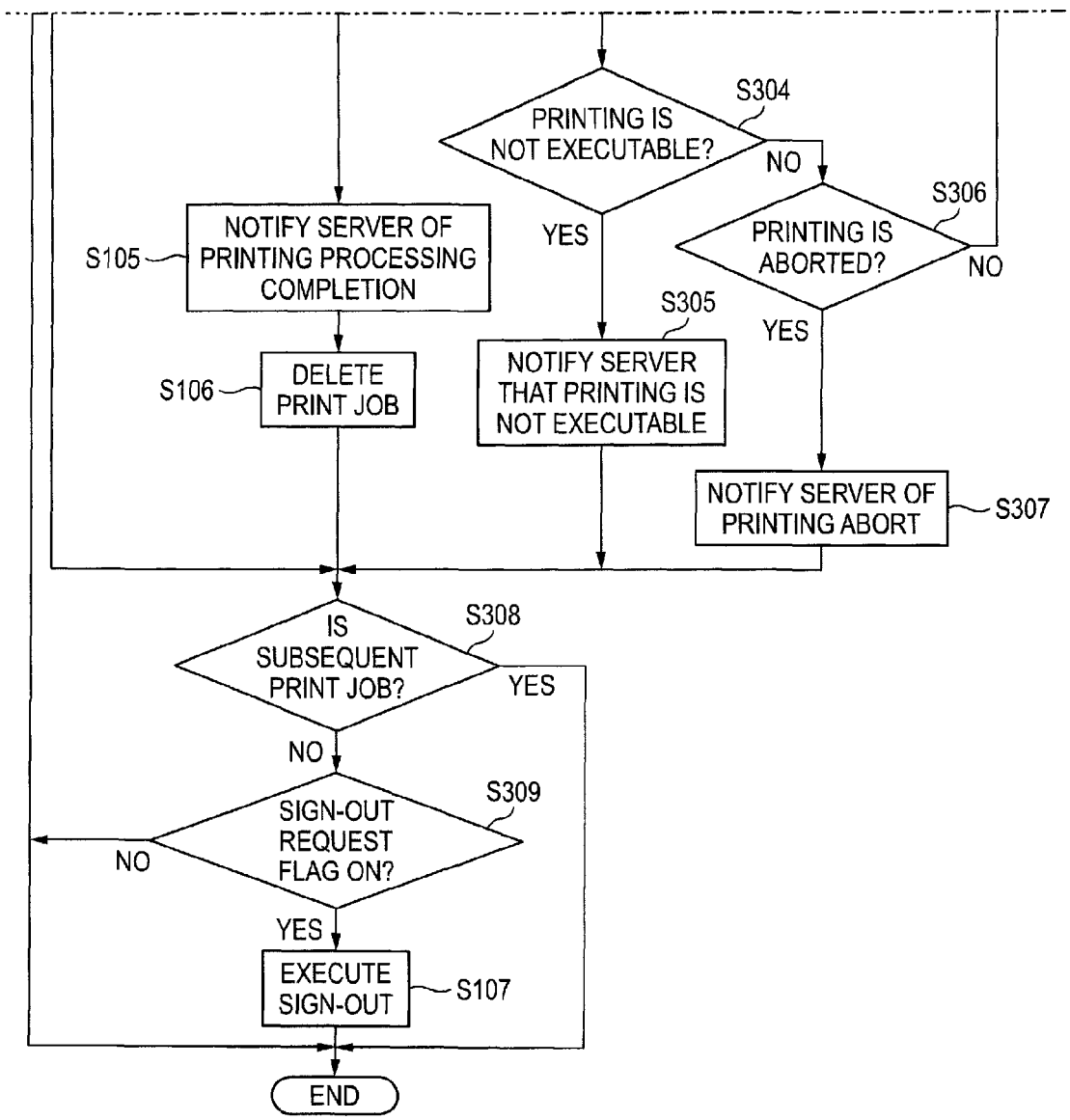

Third sign-out processing will be described with reference to FIG. 9. The third sign-out processing is executed every predetermined time, for example 1 millisecond after the above described sign-in is executed.

First, when it is determined that the sign-out request is made (S101: YES), the CPU 31 proceeds to S203. When it is determined that the user having performed the sign-in is identical to the user having requested the sign-out (S203: YES), the CPU 31 proceeds to S102.

When it is determined that there is the job acquisition notification (S102: YES), the CPU 31 inquires the management server 300 about the connection state with the PC 200 and determines whether the connection between the PC 200 and the management server 300 is disconnected, depending on a result of the inquiry (S301).

Here, the CPU 51 periodically monitors the connection state between the PC 200 and the management server 300. The connection state between the PC 200 and the management server 300 is stored in the management table 340 shown in FIG. 4. Specifically, when the connection between the PC 200 and the management server 300 is disconnected, a PC connection flag is changed from ON to OFF. In the determination of S301, the CPU 31 of the printer 100 inquires the CPU 51 of the management server 300 about the connection state with the PC 200. In correspondence to the inquiry, the CPU 51 determines whether the PC connection flag of the management table 340 is ON or OFF. When the PC connection flag is ON, the CPU 51 determines that the connection between the PC 200 and the management server 300 is maintained. On the other hand, when the PC connection flag is OFF, the CPU 51 determines that the connection between the PC 200 and the management server 300 is disconnected. As a result of the inquiry, the CPU 51 transmits a result of the determination to the CPU 31.

When it is determined that the connection between the PC 200 and the management server 300 is disconnected (S301: YES), the CPU 31 stores the information, which indicates that the sign-out request has been made, in the flash memory 34 (which is one example of an 'instruction storage unit'). Specifically, the CPU 31 stores a sign-out request flag of the user information table 120 in the flash memory 34. When the sign-out request is made, the CPU 31 changes the sign-out request flag from OFF to ON (S302).

Figure 10:
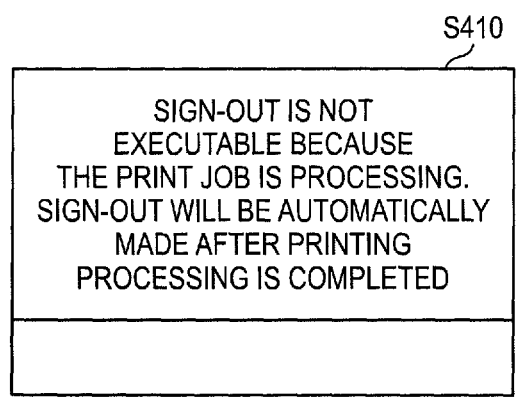
FIG. 10 shows an example of a message prohibiting sign-out in the third sign-out processing of the invention.

Then, the CPU 31 displays a message 410 shown in FIG. 10, which indicates that the sign-out is unable to be performed and the sign-out will be automatically executed after the printing is completed, on the operation panel 40, thereby informing the user of the same (S303, which is one example of a 'second notification unit').

Subsequently, the CPU 31 determines whether the printing processing is completed (S104). When it is determined that the printing processing is not completed (S104: NO), the CPU 31 determines whether the image forming unit 10 is unable to execute the printing because the print job is unable to be received or an error is caused (S304).

When it is determined that the printing is unable to be executed (S304: YES), the CPU 31 notifies the management server 300 that the image forming unit 10 is unable to execute the printing (S305).

On the other hand, when it is determined that the printing can be executed (S304: NO), the CPU 31 determines whether an abort of the printing processing is instructed by determining whether an abort button on the operation panel 40 is pressed, for example (S306). Incidentally, the abort may be performed by a remote operation, in addition to the configuration where the abort button is pressed on the operation panel 40. For example, the printer 100 may have a server installed therein and the installed server provides the PC 200 with an operation screen with which a user can instruct the printer 100 to perform the printing or abort. In the provided operation screen, an abort button may be displayed, and it may be configured to determine whether the abort button is pressed by a click operation and the like.

When it is determined that the abort of the printing processing is instructed (S306: YES), the CPU 31 notifies the management server 300 that the printing is aborted (S307). On the other hand, when it is determined that that the abort of the printing processing is not instructed (S306: NO), the CPU 31 repeats the determinations of S104, S304 and S306 until the printing processing is completed.

When it is determined that the printing processing is completed (S104: YES), the CPU 31 transmits the information, which indicates that the printing processing is completed, to the management server 300 (S105) and deletes the print job stored in the RAM 33 (S106).

Following S106, S305 and S307, the CPU 31 determines whether there is a subsequent print job of the print job, which is a target of the printing processing, in the memory area 110 (S308). When it is determined that there is a subsequent print job (S308: YES), the CPU 31 ends the third sign-out processing without executing the sign-out, because it is not possible to check the printing status of the subsequent print job if the sign-out processing is executed.

On the other hand, when it is determined that there is no subsequent print job (S308: NO), the CPU 31 determines whether the sign-out request flag is ON (S309). When it is determined that the sign-out request flag is ON (S309: YES), the CPU 31 executes the sign-out (S107, which is one example of a 'control unit') and ends the third sign-out processing.

When it is determined that the sign-out request flag is OFF (S309: NO), the CPU 31 ends the third sign-out processing without executing the sign-out.

(Advantages of Third Exemplary Embodiment)

As specifically described above, according to the third exemplary embodiment, when it is determined that the sign-out request flag is ON (S309: YES), the CPU 31 executes the sign-out (S107). Therefore, it is not necessary to again press the sign-out button on the operation panel 40, which contributes to the convenience of the user.

Further, the CPU 31 displays the message, which indicates that the sign-out will be automatically executed after the printing is completed, on the operation panel 40, thereby informing the user of the same (S303). Therefore, the user can know that the sign-out will be made without again pressing the sign-out button on the operation panel 40, which contributes to the convenience of the user.

Further, as described above, when it is determined that the connection between the PC 200 and the management server 300 is disconnected (S301: YES), the CPU 31 raises the sign-out request flag (S302), executes the sign-out (S107) and ends the third sign-out processing. Since the user makes a situation where the printing status is unable to be checked from the PC 200, it may be considered that the user has no intention to check the printing status. Therefore, there is no problem for the signed-in user even though the sign-out is executed. Further, another user who desires to sign in the management server 300 from the printer 100 can sign in the management server 300 from the printer 100, which contributes to the convenience of another user.

Fourth Exemplary Embodiment

In a fourth exemplary embodiment, after the sign-out is requested, when the abort of the printing processing is instructed from the PC 200, if the user having instructed the printing processing is identical to the user having instructed the abort of the printing processing, the sign-out can be executed. In this respect, the fourth exemplary embodiment is different from the other exemplary embodiments. The same processing as the other exemplary embodiments is indicated with the same reference numeral and the description thereof is appropriately omitted.

Figure 11:
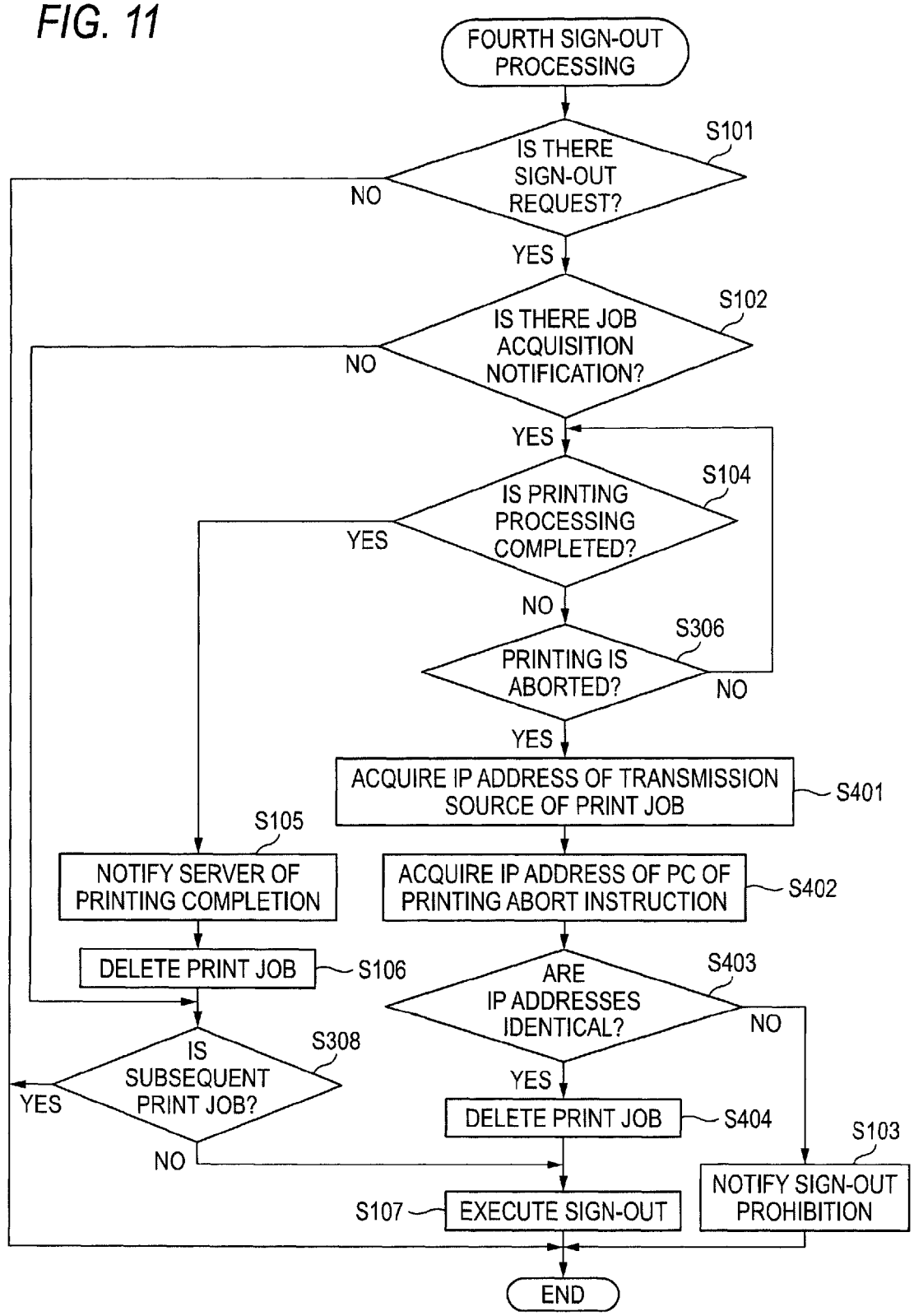
FIG. 11 is a flow chart showing a sequence of fourth sign-out processing of the invention.
Figure 12:
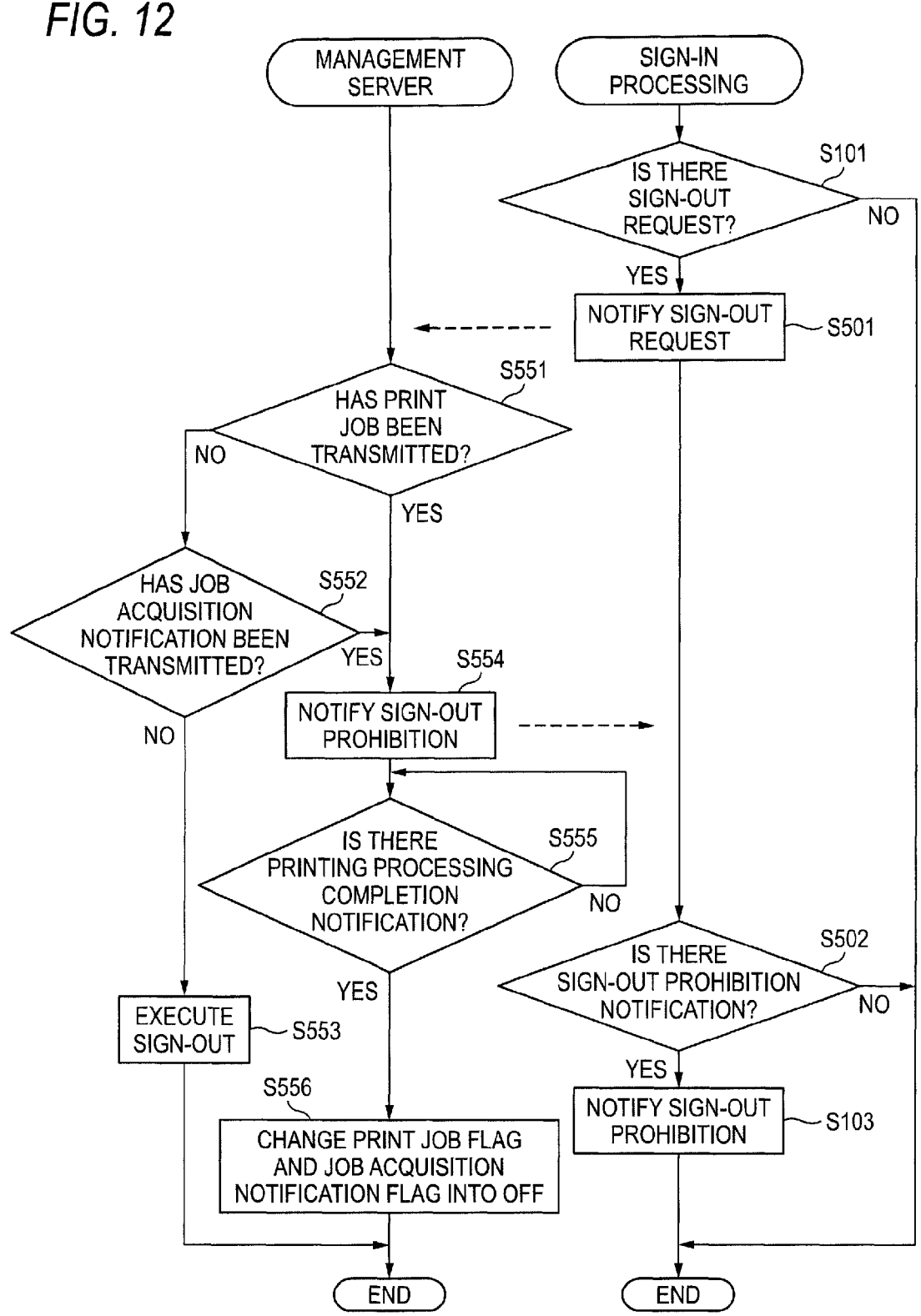
FIG. 12 is a flow chart showing a sequence of fifth sign-out processing of the invention.

Fourth sign-out processing will be described with reference to FIG. 11. The fourth sign-out processing is executed every predetermined time, for example 1 millisecond after the above described sign-in is executed.

First, when it is determined that the sign-out request is made (S101: YES), the CPU 31 proceeds to S102.

When it is determined that there is the job acquisition notification (S102: YES), the CPU 31 determines whether the printing processing is completed (S104). When it is determined that the printing processing is not completed (S104: NO), the CPU 31 determines whether an abort of the printing processing is instructed from the PC 200 (S306).

When it is determined that the abort of the printing processing is instructed (S306: YES), the CPU 31 reads out the IP address of the PC 200 (a transmission source), which is added to the print job, thereby acquiring the IP address of the PC 200 (S401). Incidentally, when it is determined that the abort of the printing processing is not instructed (S306: NO), the CPU 31 repeats the determinations of S104 and S306 until the printing processing is completed. Then, when it is determined that the printing processing is completed (S104: YES), the CPU performs processing of S105 to S308, which are the same as those of the third exemplary embodiment. When it is determined that there is a subsequent print job (S308: YES), the CPU 31 ends the fourth sign-out processing without executing the sign-out. On the other hand, when it is determined that there is no subsequent print job (S308: NO), the CPU 31 executes the sign-out (S107) and ends the fourth sign-out processing.

Then, the CPU 31 acquires the IP address of the PC 200, which instructs the abort of the printing processing, from an access hysteresis to the printer 100, for example (S402, which is one example of an 'abort user acquisition unit'), and determines whether the IP addresses are identical. According thereto, the CPU 31 determines whether the user having instructed the printing processing is identical to the user having instructed the abort of the printing processing (S403, which is one example of a 'second determination unit').

When it is determined that the user having instructed the printing processing is identical to the user having instructed the abort of the printing processing (S403: YES), the CPU 31 deletes the print job stored in the RAM 33 (e.g., a print job that is a target of the abort) (S404, which is one example of a 'second deletion unit'), executes the sign-out (S107) and ends the fourth sign-out processing.

When it is determined that the user having instructed the printing processing is not identical to the user having instructed the abort of the printing processing (S403: NO), the CPU 41 prohibits the sign-out, displays a message, which indicates that the sign-out is unable to be executed, on the operation panel 40 so as to notify the user of the same (S103). Then, the CPU ends the fourth sign-out processing.

(Advantages of Fourth Exemplary Embodiment)

As specifically described above, according to the fourth exemplary embodiment, when it is determined that the user having instructed the printing processing is identical to the user having instructed the abort of the printing processing (S403: YES), the CPU 31 deletes the print job stored in the RAM 33 (S404, which is one example of a 'second deletion unit') and executes the sign-out (S107). Therefore, when the printing processing is aborted, it is possible to avoid a situation where the sign-out is continuously prohibited.

Fifth Exemplary Embodiment

In a fifth exemplary embodiment, regarding the sign-out request, the management server 300 determines whether or not to prohibit the sign-out. In this respect, the fifth exemplary embodiment is different from the other exemplary embodiments. The same processing as the other exemplary embodiments is indicated with the same reference numeral and the description thereof is appropriately omitted.

(Fifth Sign-Out Processing)

When it is determined that the sign-out request is made (S101: YES), the CPU 31 of the printer 100 notifies the management server 300 of the sign-out request (S501).

The management server 300 determines whether the print job has been transmitted (S551). In the determination of S551, the management server determines whether a job transmission flag shown in FIG. 4 is ON or OFF. When the job transmission flag is ON, it is determined that the print job has been transmitted, and when the job transmission flag is OFF, it is determined that the print job has not been transmitted.

When the print job has not been transmitted (S551: NO), the CPU 51 determines whether the job acquisition notification has been transmitted to the printer 100 (S552). In the determination of S552, the CPU 51 determines whether the job acquisition notification shown in FIG. 4 is ON or OFF. When the job acquisition notification is ON, the CPU 51 determines that the job acquisition notification has been transmitted, and when the job acquisition notification is OFF, the CPU determines that the job acquisition notification has not been transmitted. When the job acquisition notification has not been transmitted (S552: NO), the CPU 51 executes the sign-out (S553) and ends the processing.

When the print job has been transmitted (S551: YES) or when the job acquisition notification has been transmitted (S552: YES), the CPU 51 notifies the information indicating that the sign-out is prohibited (S554). Then, the CPU 51 stands by until the printing completion notification is received (S555: NO). When the printing completion notification is received (S555: YES), the CPU 51 changes the job transmission flag and the job acquisition notification flag from ON to OFF (S556) and ends the processing. Incidentally, the job transmission flag and the job acquisition notification flag are provided for each print job. In the fifth exemplary embodiment, a case where the print job is one is described.

Back to the printer 100, the CPU 31 determines whether the notification indicating that the sign-out is prohibited is received (S502). When the notification indicating that the sign-out is prohibited is received (S502: YES), the CPU 31 prohibits the sign-out, displays a message, which indicates that the sign-out is unable to be executed, on the operation panel 40 so as to notify the user of the same (S103), and then ends the sign-in processing. On the other hand, when the notification indicating that the sign-out is prohibited is not received (S502: NO), the CPU 31 ends the processing.

(Advantages of Fifth Exemplary Embodiment)

When the print job has been transmitted (S551: YES) or when the job acquisition notification has been transmitted (S552: YES), the CPU 51 notifies the information indicating that the sign-out is prohibited (S554). Further, when the printing completion notification is received (S555: YES), the CPU 51 changes the job transmission flag and the job acquisition notification flag from ON to OFF (S556). Thus, the sign-out is prohibited after the job acquisition notification has been transmitted or after the print job has been transmitted until the printing completion notification is received. Therefore, it is possible to avoid the situation where the management server 300 and the printer 100 are unable to perform communication during the printing processing.

Incidentally, the case where the print job has been transmitted (S551: YES) and the case where the job acquisition notification has been transmitted (S552: YES) are examples of a 'starting of the printing-related operation.'

Modified Exemplary Embodiments

Incidentally, the above-described exemplary embodiments are merely examples and do not limit the invention. The invention can be variously improved and modified without departing from the scope of the invention. For example, any printer can be used insomuch as it has a printing function. For example, the invention can be also applied to a multi-function device or copier.

In the above-described exemplary embodiments, the management server 300 is connected to the internet. However, the invention is not limited thereto. For example, the management server may be connected to a network such as WAN, LAN and the like.

Further, in the above-described exemplary embodiments, the management server 300 is a server that is provided by the association company. However, the invention is not limited thereto. For example, the management server may be a server that is provided by its vendor. Further, the server provided by the association company and the server provided by the vendor may be configured to cooperate with each other.

Further, in the above-described exemplary embodiments, when the job acquisition notification is issued from the management server 300, the notification flag is changed from OFF to ON. However, the invention is not limited thereto. For example, when the CPU 31 transmits the information, which indicates that the reception of the print job has started, to the management server 300 (S001), the notification flag may be changed from OFF to ON. Further, when the CPU 31 enables the image forming unit 10 to execute the printing processing based on the print job (S003), more specifically, when a sheet feeding operation starts or when an image forming operation starts, the notification flag may be changed from OFF to ON. These configurations are examples of a 'starting of the printing-related operation.'

Further, in the above-described exemplary embodiments, the flash memory 34 is used as the non-volatile memory. However, the invention is not limited thereto. For example, an NVRAM (Non Volatile RAM) may be also used.

Further, in the above-described exemplary embodiments, when the print job starts (S106), the notification flag is changed from ON to OFF. However, the invention is not limited thereto. For example, when the CPU 31 transmits the information, which indicates that the printing processing is completed, to the management server 300 (S105), the notification flag may be changed from ON to OFF. When the information, which indicates that the printing processing is completed, has been transmitted, there is no problem for the user because there is no particularly necessary printing status even though the sign-out is executed.

In the above-described embodiment, single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

What is claimed is:

1. A printing apparatus comprising:
    a job storage unit;
    a printing unit configured to perform a printing operation based on a print job stored in the job storage unit;
    a receiving unit configured to receive an instruction of a user; and
    a control device configured to perform a process comprising:
        receiving a first instruction inputted through the receiving unit, the first instruction being for establishing a connection with an external apparatus;
        establishing the connection between the printing apparatus and the external apparatus in response to receiving the first instruction;
        receiving a notification from the external apparatus, the notification indicating that the external apparatus has received a print job;
        setting a notification flag ON in response to receiving the notification;
        receiving the print job from the external apparatus;
        controlling the printing unit to print an image in accordance with the received print job;
        storing the received print job in the job storage unit;
        determining whether the printing of the image in accordance with the print job is completed;
        upon determining the printing of the image in accordance with the print job is completed, deleting the print job stored in the job storage unit;
        in response to deleting the print job, set the notification flag OFF;
        prohibiting disconnection of the printing apparatus from the external apparatus until it is determined that the notification flag is OFF.

2. The printing apparatus according to claim 1, further comprising:
    a connection user storage unit configured to store user information indicating a user who establishes the connection,
    wherein the control device is further configured to perform:
        a disconnection user acquisition process of acquiring user information indicating a user who inputs a second instruction when receiving the second instruction; and
        a first determination process of determining whether the user information stored in the connection user storage unit is identical to the user information acquired by the disconnection user acquisition process, and
    wherein the control device is configured to terminate the connection with the external apparatus in response to the second instruction when the first determination process determines that the user information is identical.

3. The printing apparatus according to claim 1, further comprising:
    an instruction storage unit configured to store that the receiving unit receives a second instruction,
    wherein when the instruction storage unit stores that the second instruction, terminating the connection with the external apparatus, is received, the control device is configured to terminate the connection with the external apparatus after all the print jobs are deleted from the job storage unit.

4. The printing apparatus according to claim 3, further comprising:
    a second notification unit which, when the instruction storage unit stores that the second instruction is received, is configured to notify that the termination of the connection with the external apparatus will be performed after all the print jobs are deleted from the job storage unit,
    wherein the control device is configured to perform:
        a second notification process of, when the instruction storage unit stores that the second instruction is received, notifying that the termination of the connection with the external apparatus will be performed after all the print jobs are deleted from the job storage unit.

5. The printing apparatus according to claim 1, further comprising:
    an abort receiving unit configured to receive an instruction to abort the print job,
    wherein the control device is further configured to perform:
        when an abort instruction is received, acquiring user information indicating a user who inputs the abort instruction;
        determining whether the user information, which indicates that a user who inputs an instruction to execute a print job that is a target of the abort instruction, is identical to the user information; and deleting the print job, which is a target of the abort instruction, from the job storage unit when the control device determines that the user information is identical.

6. The printing apparatus according to claim 1, further comprising:
a first notification unit configured to notify that the second instruction is not received,
wherein the control device is further configured to perform:
a first notification process of controlling the first notification unit to notify that the second instruction is not received, prohibiting disconnection with the external apparatus.

7. The printing apparatus according to claim 1,
wherein the second instruction comprises a sign-out request,
wherein the termination of the connection with the external apparatus comprises disconnecting the connection in response to the sign-out request in the second instruction received by the receiving unit,
wherein the control device is configured not to allow performing the termination of the connection with the external apparatus even if receiving the sign-out request until all the print jobs are deleted from the job storage unit, and
wherein the control device is configured to allow performing the termination of the connection with the external apparatus in response to receiving the sign-out request after all the print jobs are deleted from the job storage unit.

8. The printing apparatus according to claim 1,
wherein the second instruction comprises a sign-out request,
wherein the termination of the connection with the external apparatus comprises disconnecting the connection in response to the sign-out request in the second instruction received by the receiving unit, and
wherein the control device is configured to delay performing the termination of the connection with the external apparatus in response to receiving the sign-out request until all the print jobs are deleted from the job storage unit.

9. The printing apparatus according to claim 1,
wherein prohibiting disconnection with the external apparatus comprises prohibiting performing the termination of the connection with the external apparatus after a printing-related operation starts until all print jobs are deleted from the job storage unit, such that performing the termination of the connection with the external apparatus in response to receiving the second instruction after the printing-related operation starts is delayed until all the print jobs are deleted from the job storage unit.

10. The printing apparatus according to claim 1, further comprising:
during printing, receiving a second instruction inputted through the receiving unit, the second instruction being for terminating the connection with the external apparatus;
determining whether the notification flag is ON when the second instruction is received; and
upon determining the notification flag is ON when received the second instruction, prohibiting disconnection with the external apparatus.

11. The printing apparatus according to claim 10, wherein receiving the second instruction inputted through the receiving unit occurs after deleting the print job, and wherein, upon determining that the notification flag is OFF when the second instruction is received, terminating the connection with the external apparatus.

12. The printing apparatus according to claim 1, wherein the control device is further configured to perform:
receiving the second instruction inputted through the receiving unit after deleting the print job; and
determining whether the notification flag is ON when receiving the second instruction.

13. A printing system comprising an external apparatus and a printing apparatus that is configured to communicate with the external apparatus,
wherein the external apparatus comprises a transmission unit configured to transmit a print job to the printing apparatus,
wherein the printing apparatus comprises:
a job storage unit;
a printing unit configured to perform a printing operation based on the print job stored in the job storage unit;
a receiving unit configured to receive an instruction of a user; and
a first control device configured to perform a process comprising:
receiving a first instruction inputted through the receiving unit, the first instruction being for establishing a first connection with the external apparatus;
establishing a first connection between the printing apparatus and the external apparatus in response to receiving the first instruction;
receiving a notification from the external apparatus, the notification indicating that the external apparatus has received a print job;
setting a notification flag ON in response to receiving the notification;
receiving the print job from the external apparatus;
controlling the print unit to print an image in accordance with the received print job;
storing the received print job in the job storage unit;
determining whether the printing of the image in accordance with the print job is completed;
upon determining the printing of the image in accordance with the print is completed, deleting the print job stored in the job storage unit;
in response to deleting the print job, set the notification flag OFF;
receiving a second instruction inputted through the receiving unit, the second instruction being for terminating the first connection with the external apparatus;
determining whether the notification flag is ON or OFF when the second instruction is received;
prohibiting disconnection of the printing apparatus from the external apparatus until it is determined that the notification flag is OFF.

14. The printing system according to claim 13,
wherein the external apparatus is configured to communicate with an information processing apparatus having a display unit,
wherein the external apparatus comprises a control device configured to perform:
receiving a third instruction inputted through the receiving unit, the third instruction being for establishing a second connection with the information processing apparatus; and terminating the established second connection in response to the third instruction, and wherein the first control device of the printing apparatus is configured to terminate the first connection with the external apparatus in response to the second control device terminating the second connection with the information processing apparatus.

15. The printing system according to claim 13, wherein the second instruction comprises a sign-out request, wherein terminating the first connection with the external apparatus comprises disconnecting the first connection in response to receiving the sign-out request in the second instruction, wherein the first control device is configured not to terminate the first connection with the external apparatus even if receiving the sign-out request until all the print jobs are deleted from the job storage unit, and wherein the first control device is configured to terminate the first connection with the external apparatus in response to receiving the sign-out request after all the print jobs are deleted from the job storage unit.

16. The printing system according to claim 13, wherein the second instruction comprises a sign-out request, wherein the termination of the first connection with the external apparatus comprises disconnecting the first connection in response to receiving the sign-out request in the second instruction, and wherein the first control device is configured to delay receiving the sign-out request and terminating the first connection with the external apparatus in response to receiving the sign-out request until after all the print jobs are deleted from the job storage unit.

17. The printing system according to claim 13, wherein prohibiting disconnection with the external apparatus comprises prohibiting receiving the second instruction after the printing-related operation starts until all the print jobs are deleted from the job storage unit, such that receiving the second instruction is delayed until all the print jobs are deleted from the job storage unit.

18. The printing system according to claim 13, wherein receiving the second instruction inputted through the receiving unit occurs during printing, such that, upon determining that the notification flag is ON when the second instruction is received, the first control device prohibits disconnection with the external apparatus.

19. The printing system according to claim 13, wherein the first control device is further configured to perform:

receiving the second instruction inputted through the receiving unit after deleting the print job; and determining whether the notification flag is ON when receiving the second instruction.

* * * * *